Patented Oct. 4, 1927.

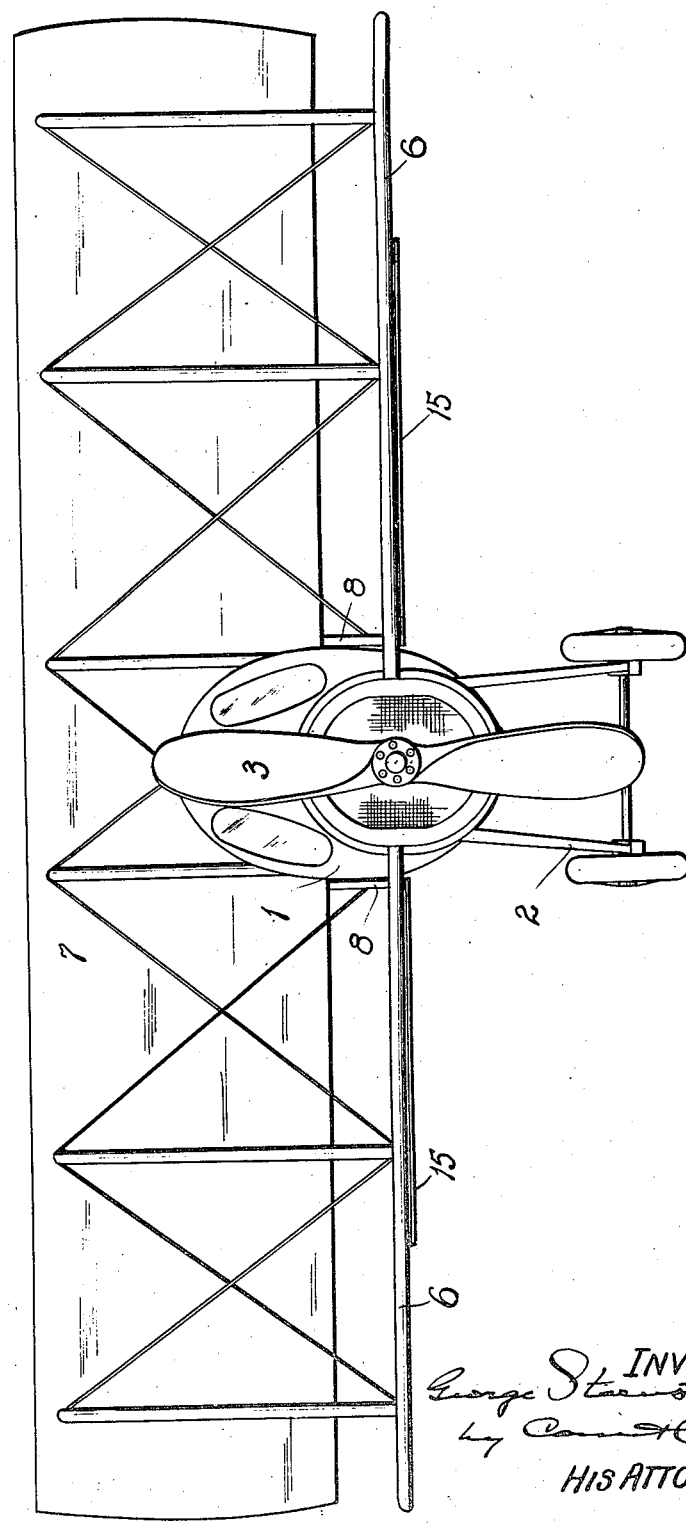

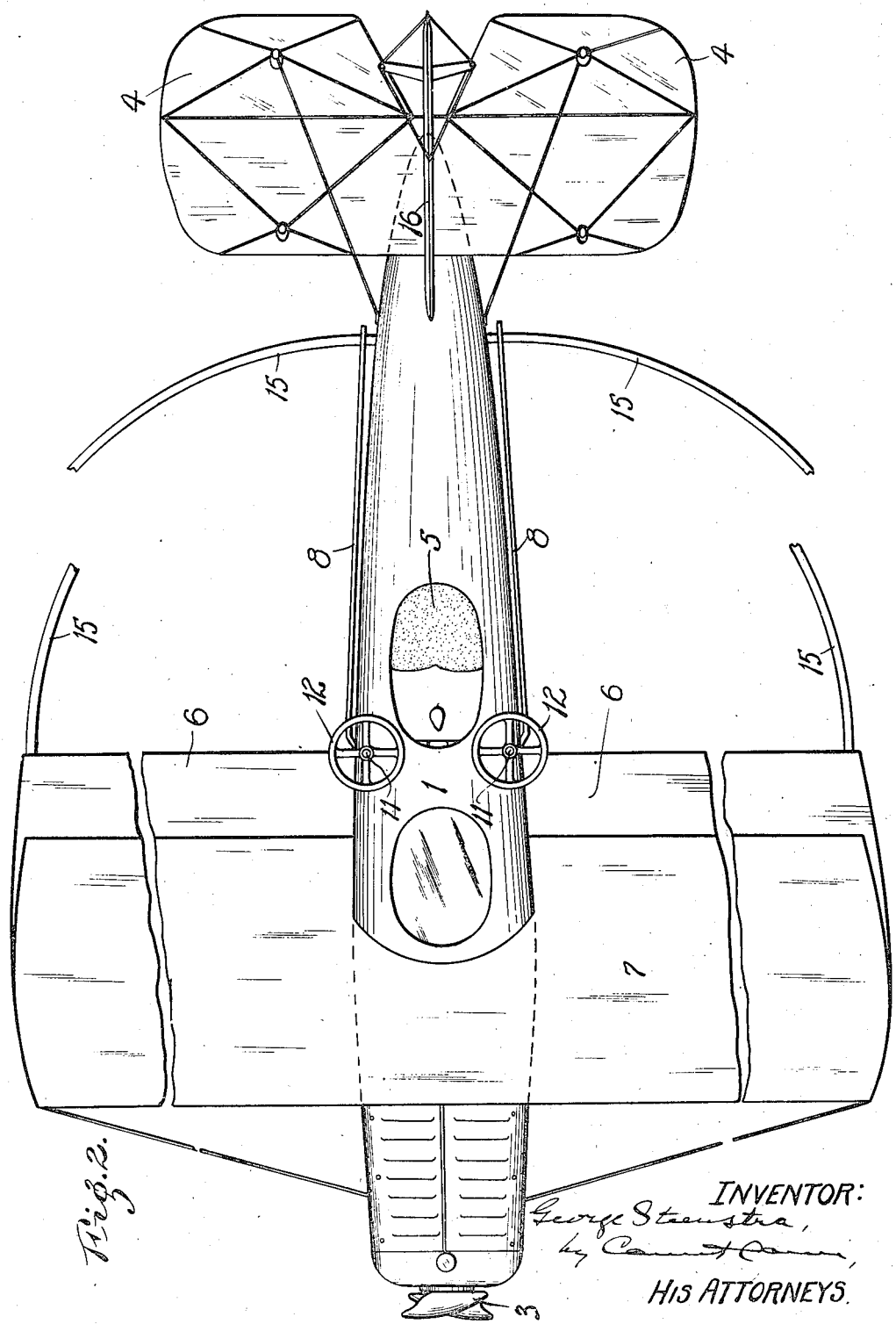

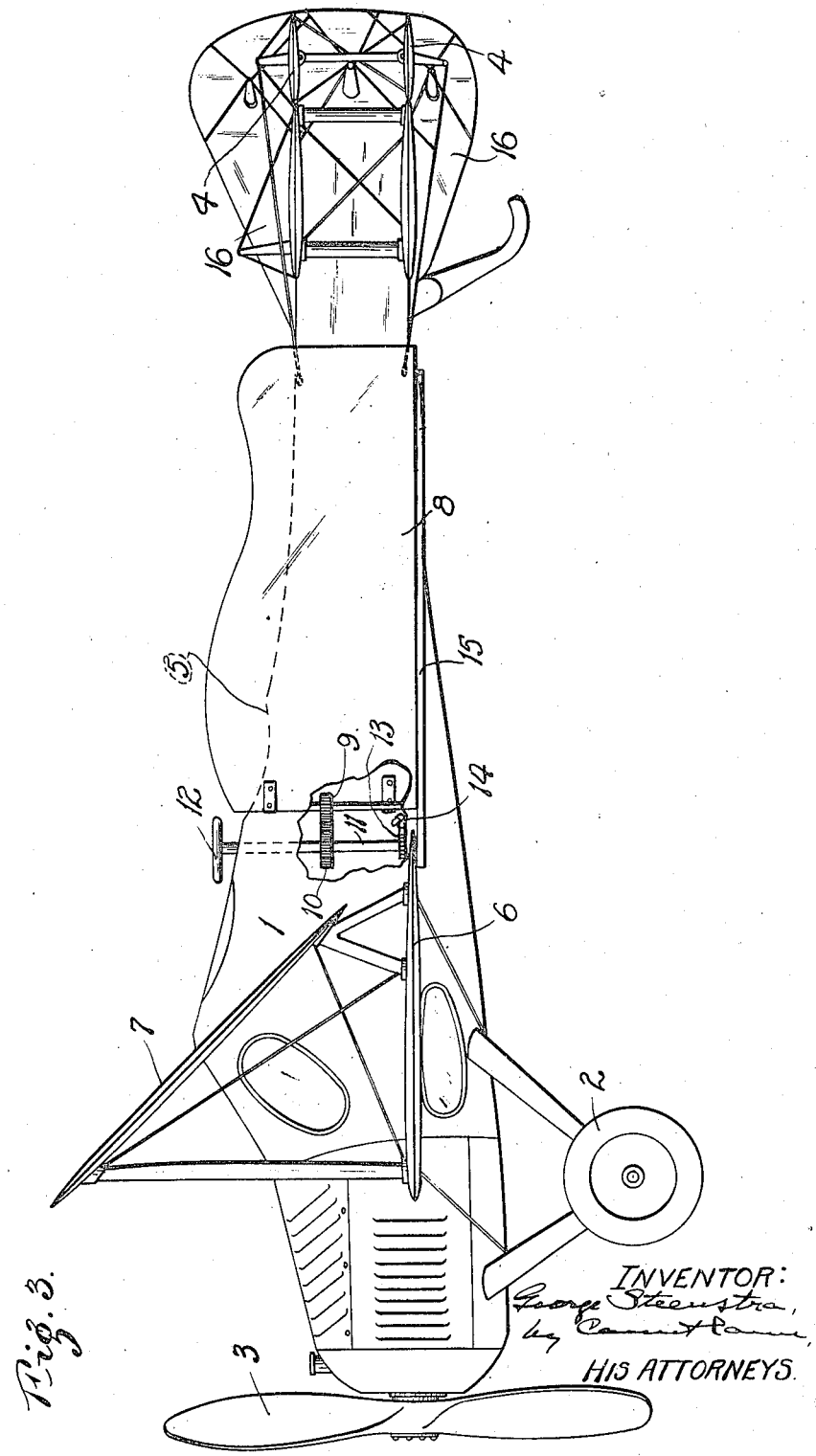

1,644,453

UNITED STATES PATENT OFFICE.

GEORGE STEENSTRA, OF ST. LOUIS, MISSOURI, ASSIGNOR OF ONE-SIXTH TO HARRY B. SELIGSTEIN, ONE-SIXTH TO MORRIS F. SELIGSTEIN, AND ONE-SIXTH TO SIDNEY J. SELIGSTEIN, ALL OF ST. LOUIS, MISSOURI.

AIRPLANE.

Application filed June 27, 1924. Serial No. 722,643.

My invention relates to airplanes and has for its principal objects an airplane that will rise very rapidly, that will carry large loads and that may be easily maneuvered. The invention consists principally in fixing the upper wing of a biplane at a steep inclination with reference to the lower wing. The invention further consists in mounting the propeller in the same plane as the lower wing of the airplane; and in mounting vertical rudders on either side of the fuselage instead of mounting a single rudder to the rear of the airplane. The invention further consists in the airplane and in the parts and combinations of parts hereinafter described and claimed.

In the accompanying drawings, which form part of this specification and wherein like reference numerals indicate like parts wherever they occur.

Fig. 1 is a front elevation of an airplane embodying my invention,

Fig. 2 is a top plan view thereof, and

Fig. 3 is a side elevation.

The fuselage or body 1 is provided with suitable running and landing gear 2, with a propeller 3 and with horizontal rudders 4 at the rear for regulating the ascent and descent of the airplane. The fuselage is provided with a suitable cock pit 5 for the operator.

The airplane is provided with a lower wing 6 that is disposed more or less horizontally on either side of the fuselage, as is common practice with the lower wings of biplanes. The upper wing 7 is inclined relative to the lower wing, preferably at a 45 degree angle, and is fixed in this position. Preferably the upper wing 7 is of such dimensions and position that a continuation thereof would coincide with the rear edge of the lower wing 6.

The axis of the propeller 3 is located in a continuation of the plane of the lower wing 6.

Pivotally secured to either side of the fuselage near the middle thereof and adjacent to the cock pit are vertical rudders 8 of comparatively large size. Secured to each rudder 8 is a gear 9 that meshes with a gear 10 on a rotatable shaft 11 mounted in the fuselage and provided with an operating wheel 12. Each shaft 11 is also provided with a ratchet gear 13 whose teeth are engaged by a pawl or detent 14, so that the shaft 11 may be locked in any desired position so as to hold the rudder stationary. Secured at one end to the lower wing 6 and at the other end to the fuselage 1 are arcuate guide rods 15, one for each rudder 8, said guide rod extending through a hole near the outer end of the rudder. The airplane is steered in one direction by one of said rudders 8 and in the other direction by the other rudder. The speed of the airplane may be reduced by swinging both rudders outward.

The airplane may be provided with a vertical fin or stabilizer 16 at the end.

Fixedly mounting the upper wing at a very steep inclination increases the lifting power of the airplane and makes it possible for the airplane to ascend rapidly, only a very short run on the ground being required.

Mounting the propeller so that its axis is in line with the lower wing causes the stream of air from the propeller to be divided, one-half passing beneath the lower wing and one-half between the upper and lower wings, thus making said air stream more effective. The vertical rudders enable the airplane to make sharp turns, they enable the airplane to be kept in nearly horizontal position while turning and minimize the necessity for banking the airplane while turning.

The rudders and wings are preferably made of aluminum or other light metal.

What I claim is:

1. An airplane comprising a lower wing, and an upper wing inclined relative thereto, said upper wing being so positioned that a continuation thereof would coincide with the edge of the lower wing.

2. An airplane comprising a body, wings, rudders hingedly secured to the sides of said body near the middle thereof, and a guide for each of said rudders, each of said guides comprising an arcuate rod secured to said wing and to the body and passing through a hole in the outer end portion of a rudder.

Signed at St. Louis, Missouri, this 21st day of June, 1924.

GEORGE STEENSTRA.